July 25, 1939.　　P. KOLLSMAN　　2,166,956
SHOCK ABSORBER
Filed March 11, 1933　　3 Sheets-Sheet 1
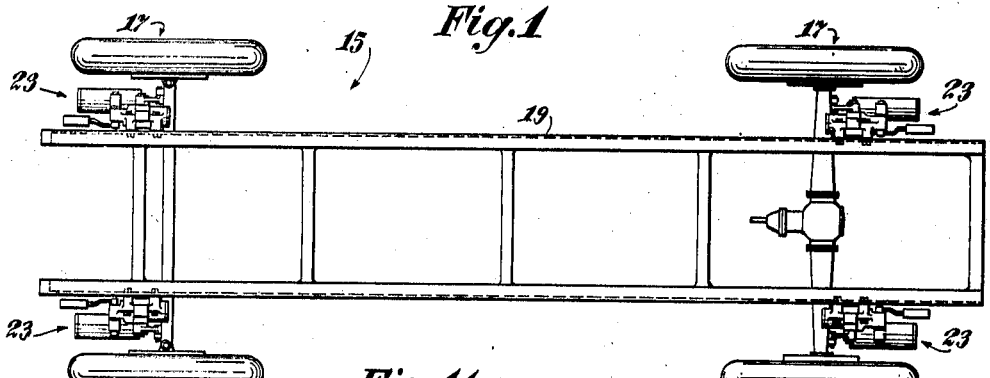
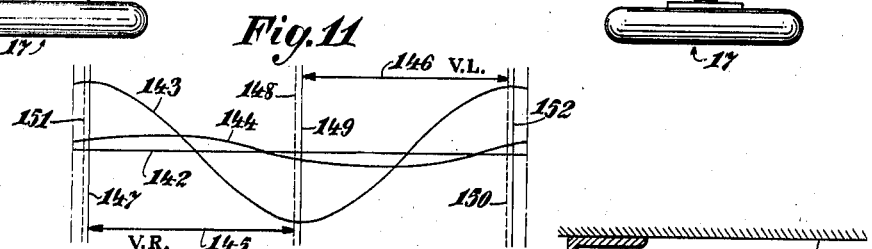
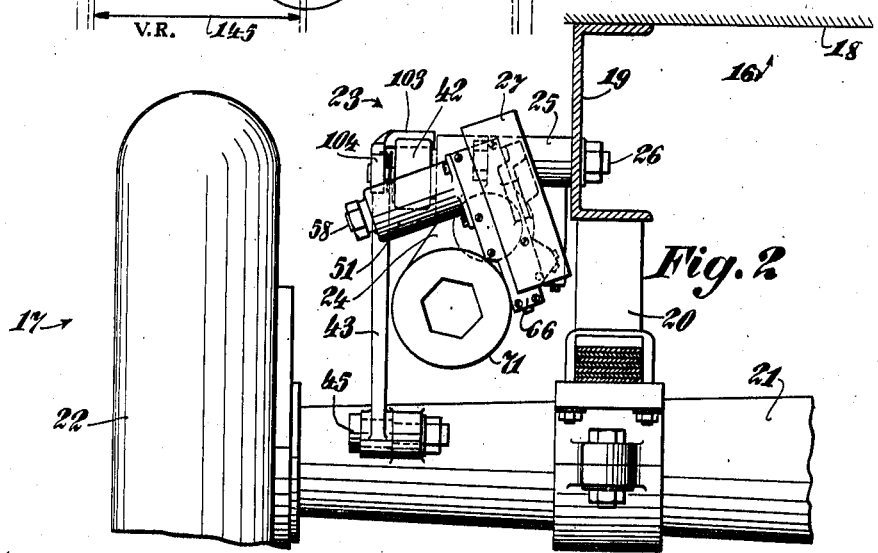
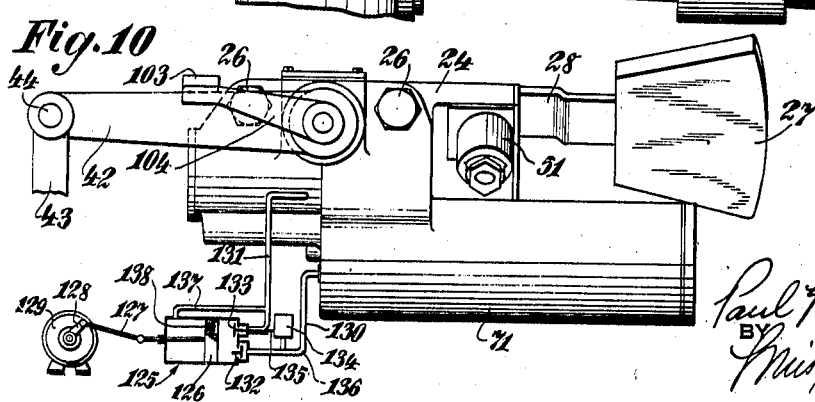
INVENTOR
Paul Kollsman
BY
Chris Schumacher
ATTORNEY July 25, 1939.  P. KOLLSMAN  2,166,956
SHOCK ABSORBER
Filed March 11, 1933     3 Sheets-Sheet 2

INVENTOR
Paul Kollsman
BY
Chris Shumacher
ATTORNEY

July 25, 1939.  P. KOLLSMAN  2,166,956
SHOCK ABSORBER
Filed March 11, 1933  3 Sheets-Sheet 3
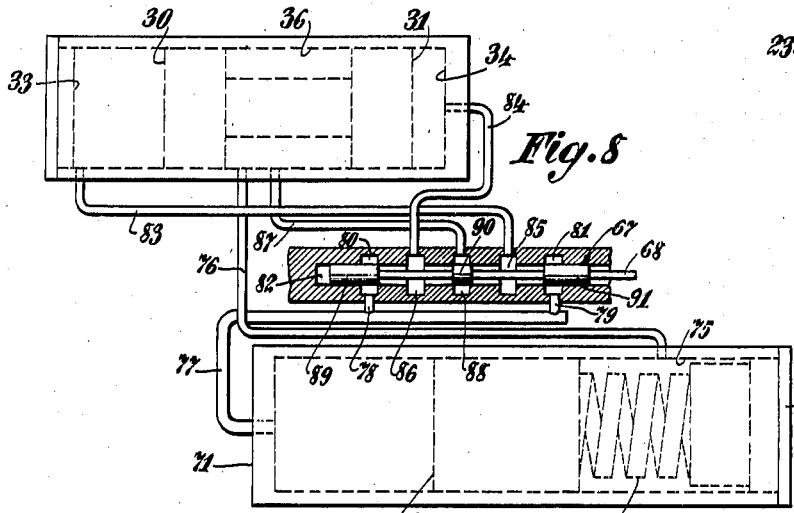
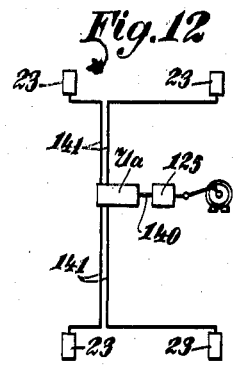
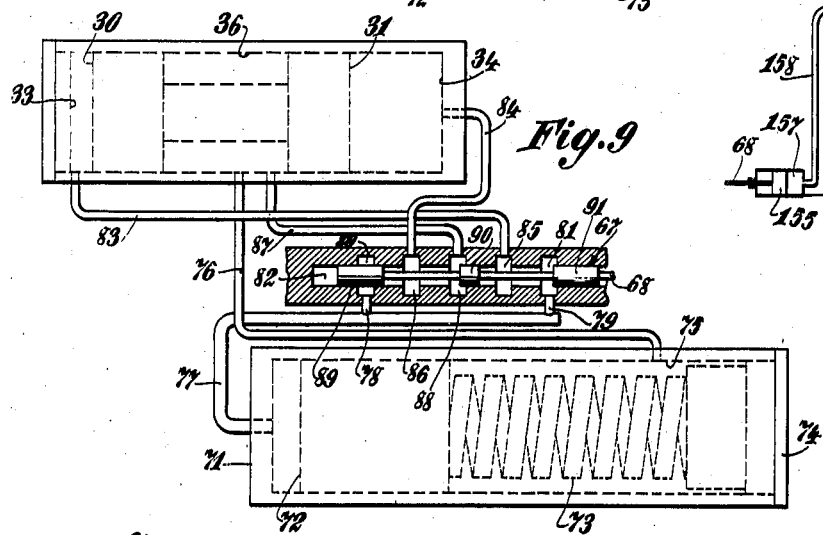
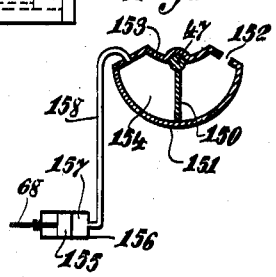
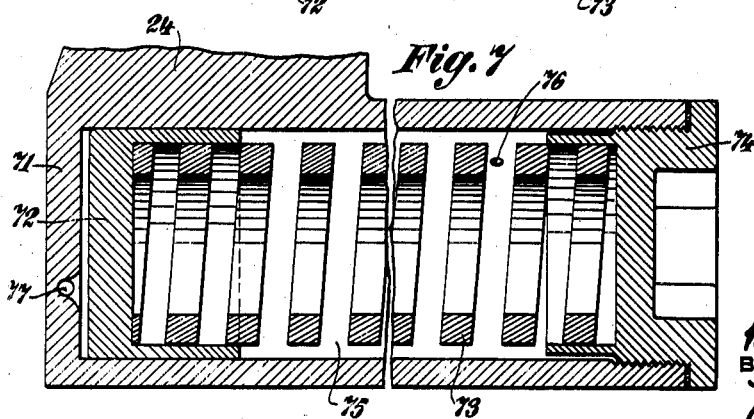
INVENTOR
Paul Kollsman
BY
Shumacher
ATTORNEY Patented July 25, 1939

2,166,956

UNITED STATES PATENT OFFICE 2,166,956

SHOCK ABSORBER

Paul Kollsman, New York, N. Y.

Application March 11, 1933, Serial No. 660,367

83 Claims. (Cl. 267—8)

This invention relates to devices including shock absorbers.

One object of the invention is to provide a device of the character described having improved means whereby the device is movable in one direction for exerting a yielding force to resist a movement and in different direction for causing a movement.

Another object of the invention is the provision of a device of the nature set forth having improved means whereby the device shall function substantially continuously while a movement or oscillation is occurring.

Another object of the invention is to furnish an improved device of the nature set forth, which when embodied in or applied to a vehicle, for example, shall govern any of the following conditions or any combinations of the conditions, including an upward movement of the vehicle body and an upward or a downward movement of the support thereof, and a downward movement of the vehicle body together with an upward or a downward movement of the support, and a sudden upward or a downward acceleration of a support of a vehicle body regardless of the relative direction of the latter; upward and downward directions of movement can be regarded as separate conditions.

Another object of the invention is to construct a device of the class alluded to which when applied to or embodied in a plurality of members movable relatively to each other as in response to an impulse, and including, for instance, a vehicle body and a wheeled support therefor, shall be controlled by movements or changes in direction of movements of the body or of the support, or of both body and support.

Another object of the invention is to devise a device of the type mentioned having improved means which shall tilt a member such as a vehicle body when a structure such as a vehicle suffers a lateral impulse or acceleration as in rounding a curve, and said means, if desired, also controlling relative vertical movements between a plurality of members such as a vehicle body and support in response to impulses or changes in directions of movement in upright planes.

Another object of the invention is to provide a device of the character described including an energy supply means, an energy storage means, or both, for improved operation, and, if desired, arranged in an improved central power plant relation to a plurality of actuating means such as shock absorbers.

Another object of the invention is to furnish an improved device of the nature set forth having relatively few and simple parts, and which is comparatively inexpensive to manufacture, durable, reliable, and efficient in use, as regards both a shock absorber and a structure such as a vehicle embodying the same, as well as an improved arrangement and coordination of the shock absorber and vehicle structure for maximum sensitivity, and whereby elements such as the usual springs between the vehicle body and its support may be omitted.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a top plan view of a device embodying the invention.

Fig. 2 is an enlarged fragmentary view thereof in end elevation with parts in section.

Fig. 7 is a fragmentary sectional view of a power storage means taken on a vertical plane.

Figs. 8 and 9 are diagrammatic views in elevation, with parts in section, showing features of the invention, and with a valve in different positions in the different views.

Fig. 10 is a plan view of a modification of the invention, with certain parts diagrammatically shown.

Fig. 11 is a diagram including curves showing a performance of the invention.

Fig. 12 is a diagrammatic view of another modification of the invention.

Fig. 13 is a diagrammatic view with parts in section of a modification of the invention.

Figure 3:
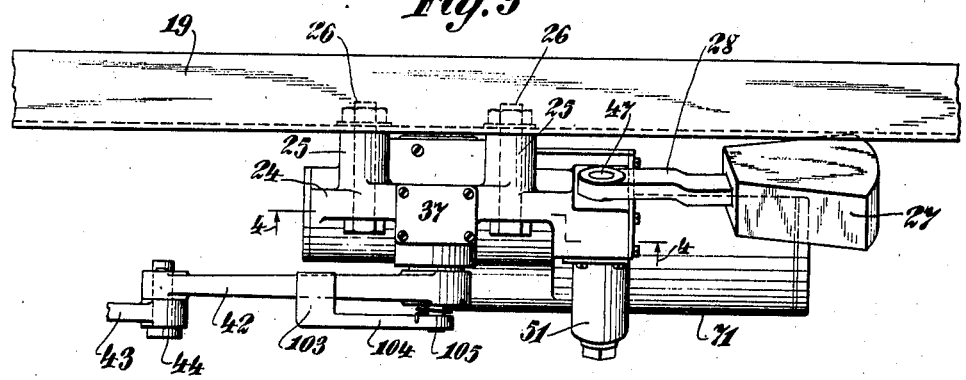
Fig. 3 is a fragmentary top plan view of the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention.

Referring in detail to the drawings, 15 may denote a device embodying the invention. The same may be understood as applied to or embodied in a structure, such as, for example, a vehicle or automobile, and having a plurality of members traveling as a unit and movable relatively to each other when one of the members is subjected to a suitable impulse. One of these members can be considered to be the chassis or body 16 of the automobile, and the other member may be the support 17 upon which the chassis may be mounted in a suitable cushioned manner. For illustration, a chassis 18, including a frame 19 may be mounted by resilient means such as a spring 20 on a shaft means 21 having the usual wheels 22 at the ends thereof. It is seen that the members 16, 17 of the traveling device are movable relatively to each other, and are also movable as a unit up or down, according to forces applied to one or both of the members, as by reason of irregularities in a roadway on which the device is driven.

Movable with one of the members, such as the chassis 18, is a device 23 which controls the relative motion between said members. The device 23 may be in the nature of a shock absorber acting between the chassis 18 and the support 17. Said device may include a casing 24 having a plurality of lugs 25 secured to the frame 19 as by bolts 26. Movably carried by the casing is a weight 27 which is mounted so as to be responsive to inertia effects. One form of mounting may include a member movable up and down such as an arm 28, and as said arm extends in the general direction of the frame, the weight can be positioned in relative proximity to an end of the chassis. It will be noted that in a vehicle having four wheels or points of support, as shown in Fig. 1, a device 23 may be provided for each wheel, and in each case, the device 23 will be arranged so that the weight 27 is disposed as far as possible from the center of the vehicle so as to be more readily responsive to forces acting on the members 16 and 17. For the same reason, said devices 23 are located on the outside of the frame 19. The devices shown may be duplicates of each other except that right and left hand devices are provided for the corresponding sides of the vehicle.

The casing 24 may include a suitable power transmitting means, as, for instance, one or more pistons 30, 31 which may be in alined relation with each other and associated for coordinated movement as by an interconnection 32. Said pistons may be movable, preferably for reciprocation, as in individual cylinders 33, 34. One of the cylinders may be closed by a removable plug 35. The cylinders may communicate back of the pistons with a chamber 36 in the casing 24 which may constitute a reservoir for the power fluid as hereinafter described, and having a fluid or liquid level at any suitable elevation.

At the upper portion of the chamber 36, a removable closure 37 may be provided. Extending at an angle to the path of travel of the pistons is a shaft 38, which may be disposed above said path, and journaled in the side walls of the casing 24. Fixed to said shaft, an arm 39 may be provided which may extend into an opening 40 in the connecting means 32, said arm having a suitable head 41, whereby the shaft 38 can be oscillated upon reciprocation of the piston means. Fixed to the shaft 38 externally of the casing, there may be an arm 42 which may extend substantially horizontally in neutral position of the piston means, a link 43 pivoted to said arm at 44 extending substantially vertically downward into pivotal connection at 45 with the shaft means 21 in relative proximity to a wheel 22. It will now be seen that the action of the spring 20 is influenced by the movement of the piston means so as to cause a greater downward movement of the wheel than would be caused by said spring alone or to diminish the downward movement of the wheel that would be caused by the spring.

Figure 5:
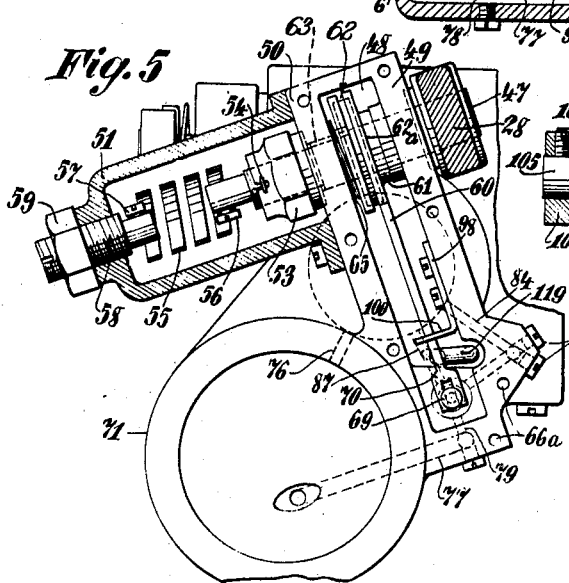
Fig. 5 is a fragmentary end view of the device with parts in section and certain end plates removed to show internal construction.
Figure 6:
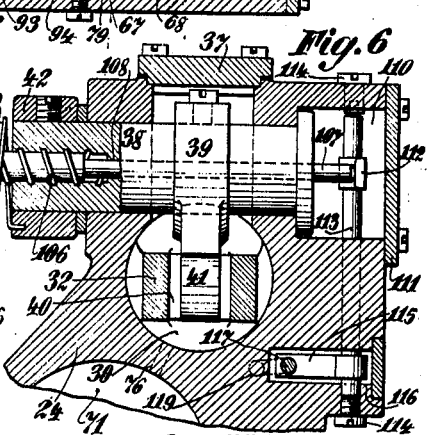
Fig. 6 is a vertical sectional view taken on line 6—6 of Fig. 4, and with parts broken away.

The arm 28 of the weight 27 is mounted on a shaft 47 which extends in the general direction of the shaft means 21, and may lie in a horizontal plane, but is preferably arranged at a suitable angle to the horizontal in order to perform additional functions as hereinafter described. In the devices 23, said shaft may desirably be inclined in the same general manner, as, for instance, toward an adjacent end of the shaft means 21, in a vertical plane parallel to that of the latter. Said shaft 47 may extend through compartment 48 in the casing 24, in side walls 49 and 50 of which the shaft may be suitably journaled. The said compartment 48 may extend at right angles to the axis of said shaft 47, as shown in Fig. 5, and the side wall 50 of said compartment may have a housing 51 extending therefrom in alinement with the shaft 47, and into which the latter extends. Within said housing, a castle nut 53 is threaded on the shaft and after being adjusted, is locked by a cotter pin 54. In order that the center of gravity of the weight 27 may lie resiliently in a horizontal line passing through the axis of the shaft 47, a resilient means such as a coil spring 55 may have one end thereof connected at 56 with the shaft 47 and its other end connected at 57 to an adjusting screw 58 which may be set by a lock nut 59. Since the screw 58, spring 55 and shaft 47 are in alined relation, adjustment may be readily made to maintain the center of gravity of the weight 27 in horizontal plane above mentioned, which position may be referred to as the neutral position of the weight.

The weight 27 is adapted to oscillate up and down under control of the spring 55 and controls a means whose position is changed when the weight suffers a change in its direction of movement at any point in its path of oscillation, although the weight may continue its movement in a given direction along its path without affecting said means. The means referred to may be an arm 60, having a hub 61 which may be freely journaled on the shaft 47, and means may be associated with the shaft for accomplishing the control above mentioned. The associated means may be a hydraulic device as hereinafter described, or a simple friction clutch 62 which may be keyed at 63 to the shaft 47 so as to be movable into frictional engagement with a clutch face 62a of the hub 61, under actuation of an expansion coil spring 65. The compartment 48 may be closed by a removable end plate 66 held in place by screws threaded into holes 66a.

Operated by the member 60 is a means which arranged to control one or more power conduits.

Thus a valve of any suitable type may be employed, such as a piston type valve 67 which may be reciprocable as by having a stem 68 thereof provided at 69 with a grooved portion for receiving a yoke 70 of the arm 60. The path of movement of said valve or actuator may be defined as that path or portion thereof along which the valve is movable to accomplish its functions, and the end positions of the valve may be regarded as those points or positions, at which, when the valve reaches the same, the invention is operable correspondingly. The said valve may control passages communicating with the cylinders 33 and 34, and also with fluid reservoir and fluid power storage means, as may be desired. The fluid power storage means may include a cylinder 71 which may form a part of the casing 24, and which may have a piston 72 actuated toward one end of the cylinder by an automatically operating means, such as a powerful expansion coil spring 73 acting between the piston and a removable closure element 74. The reservoir may include the chamber 36 and that portion of the chamber 75 in the cylinder 71 which is back of the piston 72. Thus a passage 76 may communicate with a lower portion of the reservoir 36 and with an upper portion of the chamber 75, this arrangement, moreover, permitting any air bubbles in the chamber 75 to flow upward through said passage into the chamber 36 in which a suitable liquid level may be maintained.

Referring particularly to Figs. 8 and 9, a passage 77 communicates with the cylinder 71 in advance of the piston 72, and through branches 78, 79 with annular enlargements 80, 81 in a cylindrical bore 82 in which the valve 67 is reciprocable. Passages 83, 84 communicate respectively between cylinders 33, 34 and annular enlargements 85, 86 of the cylinder 82. A passage 87 may communicate between the reservoir chamber 36 and an annular enlargement 88 of the cylinder 82. The various enlargements 80, 86, 88, 85 and 81 may be successively, uniformly spaced with respect to each other, and the valve 67 may include a plurality of successive valve sections 89, 90 and 91, interconnected as a unit by the stem 68, for controlling the different enlargements and the passages that communicate therewith. A simple manner of constructing the cylinder 82 and its various enlargements, is to utilize a plurality of separate tubular elements such as 92 and other tubular elements such as 93 of larger internal bore than the elements 92 and successively interposed between the elements 92, all of the tubular elements 92 and 93 being in alined relation with each other and being snugly received and interfitted in a smooth walled cylindrical bore 94 of the casing 24. At one end of the bore 94, a vent passage 95 may communicate therewith and with the chamber 36.

When the weight 27 is in neutral position, the valve 67 is in a corresponding neutral position, as shown in Fig. 8, in which case the passages 77, 84 and 87 are closed. However, when the weight 27 is above neutral position, the valve 67 is at the right of neutral position, as shown in Fig. 9. In that case, the power cylinder 71 and the cylinder 33 are in communication through passage 77, branch 79, (branch 78 being closed by valve section 89), to 81 thence through the valve cylinder to 85 and passage 83. Cylinder 34, in the same position of the valve 67, is in communication with reservoir chambers 36 and 75 as follows: passage 84 to 86, through the valve cylinder to 88, then through passage 87 to chamber 36, the latter being in communication with chamber 75 through the passage 76. Therefore any clockwise movement of the arm 42 tends to cause the pistons 30, 31 to be moved toward the left by the arm 39, so that piston 30 acts in opposition to the piston 72, and hence the power cylinder 71 with its spring 73 serves to cushion the chassis 18. Therefore a correspondingly weaker spring 20 may be used, or the same may even be eliminated, it being noted that the oil may flow back and forth as between cylinders 33 and 71 until a counterbalance occurs between the force due to the weight of the chassis and the force of the spring 73, such flow being free to occur when the weight 27 is beyond neutral position, or when the valve 67 is moved beyond neutral by the weight 103 as hereinafter described.

When the weight 27 is below the neutral position, the valve 67 is in the position shown in Fig. 4, that is, at the extreme left end of its path of travel. Branch passage 79 is now closed, but the power cylinder 71 communicates through passage 77 and branch 78, through the valve cylinder and the passage 84 with the cylinder 34. Cylinder 33 now communicates through passage 83, the valve cylinder and the passage 87 with the reservoir chamber 36, the latter of which also communicates with the reservoir chamber 75. The operation of the device is now reversed with respect to the operation of the device in the position shown in Fig. 9, so that the power cylinder 71 tends to move the piston 31 toward the left, whereby the arm 42 is moved clockwise. But if a superior force causes a counterclockwise movement of the arm 42, then the pistons 30 and 31 are caused to move toward the right so that the piston 31 pumps oil into the power cylinder 71 against the force of the spring 73.

The various passages 76, 77, 83, 84, 87 may be formed by boring or casting the same in the wall of the casing 24. If drilled in the casing wall, removable screws or closure plugs 96 may be employed.

Associated with the arm 60, there may be provided means 97 for limiting the path of travel of the valve, such as a plate 98 having spaced stop lugs 99, 100 disposed on opposite sides of the arm. To adjust the stops, said plate may be movably mounted on the wall 49, as by means of set screws 101 passing through a slot 102 in the plate, whereby the latter may be set at any desired distance from the axis of the arm 60, so that the angular motion of said arm may be correspondingly limited.

In the event that one of the members 16 or 17 is subjected to a sudden acceleration, and particularly in case the wheel 22 is suddenly moved up or down at high speed, a suitable control means is provided responsive to such action for the general purposes herein stated. Thus a weight 103 is provided responsive to such action of the wheel according to a difference of inertia between the weight and the structure that actuates the same, and hence said weight 103 may be mounted in any suitable manner consistent with this object. Thus the weight may be actuated directly by the arm 42, and hence may freely rest thereon, said weight being connected to a guide means or arm 104 which may be so coordinated that the movement thereof is neutralized if it occurs at the same speed as that of said arm 42. Hence the arm 104 may be secured to a traveling element such as a screw 105 having relatively coarse threaded engagement at 106 in the shaft 38 in axial alinement therewith. The screw 105 may also have an integral pin 107 extending through an axial bore 108 in the shaft 38 so as to be longitudinally movable upon relative rotation between the shaft 38 and screw 105. A coil spring 109 acting between the arms 42 and 104 tends to maintain the weight 103 resting on the arm 42 and hence the screw 105 and pin 107 in predetermined relative position. The end of the pin 107 may extend into a space 110 closed by a removable plate 111, a finger 112 being mounted on a rock shaft 113 so as to be actuable by the pin 107. Said rock shaft may be mounted on bearings 114. A second finger 115, located in an opening 116 may be mounted on the rock shaft 113 for actuating a pin 117 that is suitably mounted for longitudinal sliding movement as in a bore 118. The pin 117 may extend into the chamber 48 and be provided with an offset end portion 119 adapted to aline with the arm 60 so as to be adapted to cause a movement thereof about the shaft.

The weights 27 and 103 and their operating mechanisms are so related that even if the weight 27 should have caused the arm 60 to move toward the left so as to place the valve in its left end position, the weight 103 may rock the shaft 113 counterclockwise and hence cause finger 115 to move the pin 117 toward the right until the arm 60 strikes the stop lug 100, when the valve 67 will be at its right end position.

It will be noted that since the movement of the pin 107 depends upon a relative angular motion between members 38 and 105, it is immaterial how such motion is caused. It will be observed that such motion can occur if the arm 42 is accelerated upward so that the weight 103 is caused to fly up from the arm, and also if the arm 42 is downwardly accelerated so that the weight 103 follows at a lesser speed. The spring 109 may be relatively weak so as not to affect this operation.

In the event that the weight 103 should move the valve 67 to its neutral position, then a pressure relief means may function to prevent undue stress on the shock absorber. The means referred to may include in each of the pistons 30, 31, a passage such as 120 intercommunicating the working face of the piston and the reservoir chamber 36, each passage being adapted to be closed by a safety ball valve 121 actuated by an expansion coil spring 122 that is retained by a screw sleeve 123. The spring 122 is intended to be relatively stiff so that the valve opens only under unusual conditions, and of course the valve may relieve the pressure in a cylinder in any case where the liquid pressure becomes unduly high.

In general, the piston of the power cylinder 71 remains in some neutral position in its path of movement so that said piston can move right or left, power being thus always available. Any suitable means may be provided to assure the maintenance of this condition. However, a supplemental power source may be provided, (Fig. 10) such as, for example, a small pump 125 having a piston 126 which is reciprocated by a connecting rod 127 and crank arm 128 rotated by any means such as an electric motor 129, or in any other manner. A feature of the invention is that while the pump is preferably continuously operated, yet when a predetermined pressure exists in one of the cylinders 33, or 34, the pressure will not become higher, even though the pump be of a positive acting type. If the pump be used together with the power cylinder 71, then a conduit 130 may connect the pump 125 with the power cylinder 71 ahead of the piston 72. A second conduit 131 may connect the pump with the lower portion of the reservoir chamber 36 or with the conduit 76. Valves 132 and 133 of a well known type may control the respective conduits 130, 131. The valve 133 may be controlled by any well known pressure regulator 134 to which the stem 135 of said valve may be connected. The pressure regulator is operated in any suitable manner as by being connected by a passage 136 with the conduit 130 so as to be responsive to the pressure therein. A conduit 137 may interconnect the conduit 131 and the pump cylinder at the rear of the piston. The latter may have a passage therethrough controlled by a valve 138 as in the usual force pump. The various passages 83, 84, 87 and 76, 77 are not shown in Fig. 10, being formed internally of the casing.

The pump 125 may operate as follows: On the forward stroke of the piston 126, valve 138 is closed and the valve 132 is moved by liquid pressure toward the right so as to open and permit the liquid to flow to the power cylinder 71, causing compression of the spring 73. On the retraction stroke of the piston 126, the valve 132 automatically moves toward the left into closing position and valve 138 opens. The valve 133 is normally maintained closed by the pressure regulator 134, during the forward and retraction movements of the piston so that the conduit 131 communicates with the pump cylinder only through the conduit 137. However, when a predetermined pressure exists in the power cylinder whether by reason of the action of the pump or of one of the pistons 30, 31, the pressure regulator 134 causes the valve 133 to open so that liquid compressed by the pump is by passed by the valve 133 into conduit 131 and thence through conduit 137 to the rear of the piston 126, which, therefore, merely idles back and forth.

As shown in Fig. 12, the pump 125 may, if desired, be similarly connected to all of the shock absorbers so as to operate in precisely the same manner. Preferably also, a single power cylinder 71a may be utilized in place of the individual power cylinders for the shock absorbers as hereinbefore described. 140 and 141 may schematically designate the connections between the pump and power cylinder and between the latter and the shock absorbers 23, according to the construction and mode of operation hereinbefore described.

In Fig. 11 is shown a diagram illustrating the main principle of operation of the invention, with particular reference to the function of the clutch 62. The line 142 represents the normal horizontal line of travel of the vehicle. The curve 143 represents a movement of a member 16 or chassis of the vehicle when the latter is traveling on an irregular road. The curve 144 denotes the movement of a member such as the weight 27. The lines 145 and 146 denote the full open positions of the valve 67, line 145 and the letters V. R. denoting the valve as full open at its right end position as shown in Fig. 9 and the line 146 with the letters V. L. indicating the valve as full open at its left end position as shown in Fig. 4. Between the vertical graph lines 147 and 148, it is seen that the weight 27 moves continuously upward relatively to the chassis or the latter moves continuously downward relatively to the weight 27. Hence the arm 60 moves the valve toward the right and continuously maintains the valve in this position so that the shock absorber continues to operate coincident with downward movement of the chassis. Between the graph lines 149 and 150, the direction of relative movement between the chassis and weight 27 is reversed, the chassis moving continuously upward relatively to the weight or the latter moving downward relatively to the chassis. Hence the arm 60 moves clockwise so as to move and continuously maintain the valve 67 in its left end position, with the shock absorber operating continuously. Between the pairs of lines 151, 147, and 148, 149, and 150, 152 the curves 143 and 144 are parallel in slope and hence theoretically, no relative movement will occur as between the chassis and the weight 27, except that as the distance between the lines of each pair is very small, the momentum of any relative motion will in practise carry over so that actually the valve 67 will be in a position other than neutral as long as the chassis is oscillating.

If the clutch 63 or a similar yielding means were omitted, the weight 27 would have a small limited motion determined by stop lugs 99, 100 for the arm 60, so that the weight would immediately acquire the velocity of up or down movement of the chassis, whereupon the spring 55 would immediately begin to move the weight 27 to its neutral position and return the valve 67 to its neutral position, preventing operation of the shock absorber, even though upward or downward movement of the chassis might still continue. Consequently the clutch 63 greatly increases the efficiency and range of operation of the device. It may be noted that the invention contemplates the employment of valves 67 of larger sizes and greater lengths of travel than herein shown, wherein the view as in Fig. 4 is only slightly smaller than full size, and also the utilization of different cushioning means or springs 55 of widely varying arrangement and tension, a relatively weak spring affording advantages for many purposes, and especially causing a slow return of the weight 27 to neutral position as in the case above described where the clutch 63 is omitted. However, the shock absorber is most efficient in operation if the features herein disclosed are incorporated therein.

The invention contemplates taking care of four conditions which are considered as being, generally speaking, basic. The first condition is an upward movement of the chassis and an upward movement of the wheel. The second is an upward movement of the chassis and a downward movement of the wheel. The third is a downward movement of both chassis and wheel. The fourth is a downward movement of the chassis and an upward movement of the wheel. It is believed that these are the essential elements upon which a shock absorber is to be based, and that other conditions than above enumerated will be sufficiently taken care of by the device, although the same may within the scope herein defined, be constructed to operate under other circumstances and in ways additional to or different from those herein specifically illustratively referred to.

Figure 4:
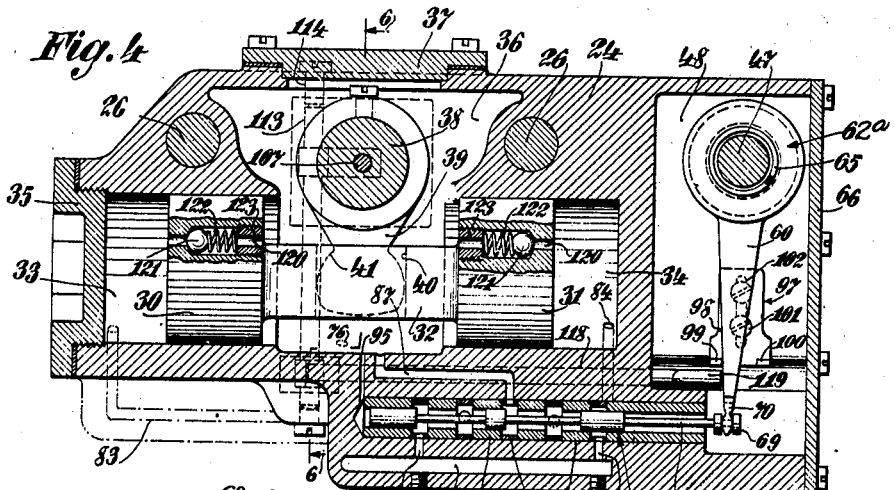
Fig. 4 is an enlarged upright sectional view taken on the broken line 4—4 of Fig. 3 at different angles with the vertical.

Under the first of the above onditions, the weight 27 may move clockwise, whereby the valve will be at the left as in Fig. 4, in which case the power fluid will flow from the power cylinder 71 through passage 77, branch 78 and through the valve cylinder to passage 84 and finally into the right cylinder 34 moving the same toward the left and causing a clockwise movement of the shaft 38 so as to tend to lift the wheel 22, whereby the upward movement of the chassis is reduced. As the piston 30 moves with the piston 31, fluid in the left cylinder 33 is caused to flow through passage 83 and the cylinder of valve 67 to enlargement 88 and hence through passage 87 to the reservoir chamber 36 or from the latter to the compartment 75 through passage 76.

If the upward movement of the chassis is accompanied by a downward movement of a wheel 22, as called for by the second condition, the weight 27 will act similarly since it is governed by movement of the chassis, and hence the valve 67 will again be at its left end position as in Fig. 4. Now the power cylinder 71 acts as a cushioning means against the downward movement of the wheel, such downward motion causing a counterclockwise movement of the shaft 38 and hence a movement of the pistons 30, 31 toward the right, the piston 31 forcing fluid into the power cylinder against the spring 73, while reservoir fluid flows into cylinder 33.

According to the third condition, the chassis and wheel 22 moving downward, the weight 27, whose inertia or frequency is different from that of the chassis, moves upward and brings the valve 67 to its right end position as shown in Fig. 9. In that case, the power cylinder 71 communicates with cylinder 33 through 77, 79, 81, 85 and 83, causing the pistons 30 and 31 to move toward the right and move shaft 38 counterclockwise for moving the wheel 22 downward. Fluid in cylinder 34 now flows into reservoir 36 through 84, 86, 88 and 87.

According to the fourth condition wherein the down movement of the chassis is accompanied by an up movement of a wheel 22, such up movement is cushioned by the power cylinder 71 as shown in Fig. 9, since the shaft 38 moving clockwise, causes a movement toward the left of pistons 30 and 31, so that fluid is forced from cylinder 33 into the power cylinder against the force of spring 73, while a flow of fluid occurs from reservoir 36 to the cylinder 34.

In conclusion, it will be noted that the position of the valve is determined by the direction of movement of the chassis, and that the power cylinder 71 and the wheel 22 act one upon the other according as one or the other is exerting the superior force.

While the chassis, which may be regarded as a member of a superior mass to the companion member or wheel 22, is moving downward, the momentum of the chassis tends to hold the wheel down to the ground. However, when the chassis is moving upward, it may be desirable to produce such action of the shock absorber as to assure that the traction of the wheel with the ground will not be diminished, and skidding caused, particularly when the wheel acquires an accelerated upward or downward movement, such as would occur as in the case of a road that is extremely irregular. In such cases it may be preferable that the normal shock absorber action be modified in the interest of safety, and possibly even to produce a higher degree of uniformity in traction than would otherwise be available. However, regardless of the principle of the device as providing a means for improving the traction of a vehicle, the invention may be regarded as embodying an inertia responsive means coacting with but having a different mass or frequency than the support or wheel; or as embodying a shock controlling or modifying device; or as incorporated in a shock absorber selectively responsive to irregularities in a road according to the slopes of such irregularities.

Fulfilling the principles above mentioned, if the wheel 22 is accelerated upward or downward, the arm 42 is correspondingly accelerated, and the weight 103 affected accordingly. Thus, assuming that an upward acceleration is caused, as by a sharp bump in the road, the weight 103 flies upward relatively to the arm 42 and hence causes a relative rotation between the screw 105 and the shaft 38 so that the elements 107, 112, 113, 115 and 117 actuate the arm 60 counterclockwise and cause the valve 67 to move toward the right to the position shown in Fig. 9. Likewise, if the wheel 22 is accelerated downward, as by the spring 20, the weight 103 will lag behind the arm 42, and hence a similar operation will occur resulting in a movement of the valve 67 to the right end position. It will be noted that with the chassis moving upward, the valve 67 would otherwise be in its left end position as in Fig. 4. In either of the above mentioned cases, the power cylinder 71, which would otherwise have been connected to cylinder 34, is now connected to cylinder 33. Hence if the wheel is moving downward, the power cylinder exerts a force to increase the speed of such movement. If the wheel 22 is moving upward, the power cylinder offers a resistance or additional cushioning means to such movement. If the wheel 22 moved up or down without acceleration, weight 103 would merely move with the arm 42, so that when the wheel moved down, the power cylinder 71 would cushion or tend to cause an upward movement of the wheel 22, while if the wheel moved upward, the power cylinder would aid such upward movement.

Assume that the vehicle is describing a turn, the weights 27 that are on that side of the vehicle that is remote from the center of the turn, tend to move away from the vehicle, due to the action of centrifugal force, and hence move upward because of the angle of their shafts 47. The weights 27 that are on the side of the vehicle nearest to the center of the turn, also move under centrifugal force, their direction of movement being toward the vehicle, and hence these weights move downward. Of course the upward moving weights 27 on one side of the vehicle move as in Fig. 9, so that the power cylinder 71 acts on piston 30 to turn shaft 38 whereby the said side of the chassis is raised. The downward moving weights 27 on the opposite side of the vehicle move their valves 67 to the left as shown in Fig. 4, so that the power cylinder 71 is connected to cylinder 34 to cause a movement of shaft 38 so as to lower the chassis. In this manner the center of gravity of the chassis is shifted inward toward the center of the turn of the vehicle. Obviously, the angle of the shafts 47 can be varied as desired to accomplish the action above described. The action above described will in general occur where the centrifugal action on the weights 27 is greater than the vertical inertia effects on the weights which tend to cause opposite actions; however, the movement of the weight 27 due to centrifugal force occurs prior to the tilting of the chassis, and the latter will in general lag behind the movement of the weight and hence have no effect thereon. The traction of the wheels on the side of the chassis that is lifted is increased by reason of increased downward pressure on these wheels. If the wheels on the side of the lowered chassis should acquire a sudden vertical acceleration, the relation of the parts may, if desired, be such that the weight 103 will overcome the action of the weight 27 and move the valve 67 to its right end position as shown in Fig. 9 to promote increased traction of these wheels, and hence prevent skidding thereof, even though the tilting of the chassis is thus reduced.

It will be understood that the terms clockwise and counterclockwise have been used herein for convenience with reference to the enlarged figures of the drawings, it being noted that an upward movement as of weights 27 of the shock absorbers on one side of the vehicle will actually cause a clockwise movement for a shaft 47 at one end of the vehicle and a counterclockwise movement for the shaft 47 at the other end of the vehicle. Likewise the term inertia responsive means may include any means which is subject to inertia, even though the same may be slower than a weight in responding to changes of direction in movement. The terms clutch or yielding means as employed herein in regard to the action of the weight 27 as exemplified by the curve 144 may include a hydraulic means. Thus, as shown in Fig. 13, a piston or vane 150 may be connected to shaft 47 for movement to and fro in a cylinder 151 according to the angular movement of the shaft. The cylinder 151 may have any opening 152 at one side of the piston and on the other side of the piston, a flow controlling means such as a valve, or merely a vent opening 153 for the chamber 154. Connected to the valve stem 68 of valve 67 is a piston 155 movable in a cylinder 156 whose chamber 157 communicates with the chamber 154 through a conduit 158. A movement of vane 150 toward the left causes compression of a fluid such as air in the chamber 154 and a corresponding movement of piston 155, the capacity of the vent being too small to affect this operation. If the direction of movement of the vane 150 changes, suction is caused in the chamber 154 and hence the piston 155 is moved correspondingly. After the piston 155 has attained an end position, according to the operation of the valve 67, the vane 150 may move further, the air flowing into or out of the chamber 154 through the vent opening 153, according as the vane moves in one or an opposite direction. Nevertheless, if the vane reverses its direction of movement at any point in its path, the piston 155 instantly coacts correspondingly. If desired, a liquid of light density may be used to diminish lag, and the capacities of the different chambers 154, 157 and of the passage 158 may be held down to a minimum.

It will be appreciated that various changes and modifications may be made in the device as shown in the drawings, and that the same is submitted in an illustrative and not in a limiting sense, the scope of the invention being defined in the following claims.

I claim:

1. A device including a movable member, means movable with said member for controlling the path of movement thereof, said means including a weight yieldingly supported for movement relative to said member, and a control element having slip engagement with said weight and responsive to movements of said weight in different directions.

2. A hydraulic shock absorber for vehicles including a double acting piston means, a valve means for controlling the flow of fluid thereto, a floating inertia means for actuating the valve means, and a power reservoir having a spring actuated piston coacting with the piston means in one or an opposite direction according to the position of the valve means.

3. A device including a movable support, a chassis mounted thereon for cushioned movement relative to the support, and means responsive to the gradations in the forces exerted between the chassis and support upon changes in their paths of movement, said means including a control element movable relative to the chassis and support as a result of the inertia of said element upon changes in the directions of said paths of movements, a double acting piston means, and a power cylinder controlled by the element for causing movement of the piston means in different directions, said power cylinder having an automatic yieldingly actuated piston.

4. A movable device including a member, a support for resiliently carrying the member so that said member is responsive to its inertia, and means for controlling movement of said member relative to said support, said means having an elastically mounted governing element responsive to inertia for movement thereof with the member but having a different period of movement than said member, said means including a control element having a lesser range of movement than the governing element and associated therewith so that, with respect to the control element, said governing element is ineffective to actuate the same at points in the range of movement of the governing element beyond the range of movement of said control element during travel of the governing element toward an end of its path.

5. A device including a chassis, a movable support therefor, said chassis being carried on said support so as to be adapted to vibrate relatively thereto, means for controlling the vibration of the chassis, and an element mounted for vibration according to a longer period than the chassis, and said means assuming different operating positions under control of said element for causing movements between the chassis and support toward or away from each other, and with the period for said operating positions being less than the period of said element, said means being associated with the element so as to be responsive to changes in direction of the element and to be otherwise substantially unaffected by the element.

6. A device including a support, a member mounted thereon for movement toward and away from the support according to impulses transmitted to said member, and yieldingly acting inertia responsive means coordinated with the member so as to be responsive to impulses on the member and having a range of to and fro movement along a path and relative to said member such that the period of said movement is greater than the period of movement of the member, and said means having a lesser range of to and fro movement along said path into different operating positions according to a period less than that of the member, and actuator means associated with the inertia means so as to be capable of intermittent movement thereby in course of the to and fro movement of the latter along its path.

7. A device including a support, a member mounted thereon for movement toward and away from the support according to impulses transmitted to said member, and inertia responsive means coordinated with the member, said means having a plurality of interacting movable elements, one of which is responsive to impulses on said member and is governed by inertia effects so as to have a period greater than and the other element having a period of movement less than that of said member and affecting the relative positions of the member and support.

8. A device including a resiliently supported member, and means for controlling movements of said member when the latter is subjected to impulses, said means including a governing element resiliently carried by said member, a movable control element, and a friction clutch means interconnecting said elements so that the control element is operated by the governing element upon movement of the latter.

9. A device including a support, a chassis resiliently carried thereon, and a shock absorber between the chassis and support, characterized in that said shock absorber includes a coacting member and element correspondingly movable to and fro, said element being subject to vertical impulses on the chassis and having a resilient mounting such that the element has a greater period of vibration than the chassis, the member being controlled by said element and having a region of operation less than that of said element, but said member being responsive to changes in direction of movement of said element at any point in the path of travel of said element, and said element being movable beyond a point corresponding to an end of said region of operation of the member.

10. A shock absorber including a piston, a cylinder therefor, a source of fluid energy, passages connecting said source with said cylinder on opposite sides of said piston, a valve movable to and fro for causing the same to open and close different passages, an element having a cushioned mounting so as to be adapted to oscillate, and a friction clutch associated between the valve and said element.

11. A shock absorber including a piston, a cylinder therefor, a means for supplying fluid energy to the cylinder at different sides of the piston and for withdrawing fluid energy from said cylinder, said means including a series of passages, a valve movable to and fro for controlling said passages, an element cushioned so as to permit the element to have a relatively large range of variable vibratory movement equal to or greater in each direction than the to and fro movement of said valve, and means whereby said element operates said valve and causes a change in direction of the valve upon a change in direction of said element at any point in the path of movement thereof.

12. A device including a chassis, a support resiliently horizontally carrying the same, and means for controlling movements between the chassis and support, said means including a resiliently mounted weight subject to impulses on said chassis and responsive to inertia effects on said weight, said weight being movable about an axis inclined at an angle to the plane of support of the chassis.

13. A movable device including a first member and a second member, the first member resting resiliently on the second member, and means for tilting the first member relatively to the second member when the device moves in a horizontal curve, said means including an inertia element having a laterally cushioned mounting so as to be movable along a path maintained at an acute angle to a vertical plane.

14. A device including in combination with a member and a resilient support therefor, of means for causing a movement toward each other of the member and support and for yieldably resisting said movement, and yielding means including an element responsive in different directions to inertia effects for controlling the operation of the first mentioned means according to a change in direction of said element.

15. A device including in combination with a movable resilient support, and a member carried thereby so as to be adapted to vibrate up and down in response to impulses thereon, of means for causing a movement toward each other of the member and support and for yieldably resisting said movement, and means to control the first mentioned means so that said movement is caused or resisted according as the member moves up or down, the last mentioned means having parts having a common path of movement, one of the parts being responsive to inertia and movable beyond said path, and said parts being differently operatively interengaged at different points in said paths.

16. A device having a plurality of separate shock absorbers each including an actuator piston, means for advancing the same, a single yielding power means to supply fluid energy for actuating the pistons of the different shock absorbers, said piston and power means acting in opposition to each other so that either one is actuated by the other dependent upon which is superior to the other, and means for individually controlling the communication between said pistons and said power means.

17. A device including a plurality of shock absorbers for wheeled vehicles, adapted to maintain the chassis of the vehicle free of vibrations normally caused by irregularities in a road, said shock absorber including means for moving a wheel of the vehicle up and down, and a single means for yieldingly resisting downward movement of said wheel, and for yieldingly resisting upward movement of the wheel, according to road conditions.

18. A shock absorber for wheeled vehicles including automatic means for tilting the chassis of the vehicle when the vehicle travels in a curve, said means including an inertia responsive element having a tilted axis.

19. A device for a vehicle having a frame and a chassis tiltably mounted thereon, including automatic means acting between the chassis and frame for tilting the chassis when the vehicle rounds a curve, in proportion to the sharpness of said curve, said means including a shock absorber between the chassis and frame, and a weight for actuating said means, said weight having a pivotal axis at an acute angle to a horizontal plane.

20. A device including in combination with a vehicle having a chassis, and a support, the chassis being mounted on the support for up and down and tilting movement relative thereto, of a shock absorber means acting between the chassis and support, said shock absorber having unitary means for controlling up and down movements between the chassis and support when up and down impulses are imparted to the vehicle and for controlling tilting movements between the chassis and support when the vehicle is subject to an impulse caused by describing a turn, and including a weight movable along a single path at an angle to a horizontal plane, and said means causing said movements to vary in extent in proportion to the impulses imparted to said vehicle.

21. A device including in combination with a chassis and a support vertically movable relatively to each other, of inertia means engaged with the support and movable relatively thereto so as to be responsive to vertical and centrifugal impulses thereon for controlling the relative movement between the chassis and the support, said inertia means having a pivotal axis at an acute angle to a horizontal plane.

22. A device including a plurality of members resiliently movable relatively to each other in an upright direction, and a plurality of elements for the respective members responsive to inertia effects causing relative movements between the elements and their corresponding members for controlling the movements between the members.

23. A device including a plurality of members resiliently movable relatively to each other in an upright direction, and a plurality of elements for the respective members responsive to inertia effects causing relative movements between the elements and their corresponding members for controlling the movements between the members, and means whereby one of the elements governs the operation of the other element.

24. In a vehicle having a support and a chassis resiliently mounted thereon for vertical movement relative to the support, the combination of means including an inertia responsive element having a different mass than the support and movable relatively thereto upon an accelerated vertical movement of the support and being unresponsive to a movement of the latter at relatively constant velocity, and a shock absorber acting between the chassis and support and having a weight responsive to inertia effects, said shock absorber being controlled by said element so as to resist upward movement of the support.

25. In a vehicle having a wheeled support and a chassis mounted thereon for movement toward and away from the support, of inertia means responsive to a sudden upward and downward movements of the support due to irregularities in a road and means coacting with the chassis and responsive to the inertia means to cause a downward movement of the support for increased traction of the latter on the road.

26. In a vehicle having a support and a chassis mounted thereon for vertical cushioned movement toward and away from the support, the combination of elements differently responsive to vertical and horizontal components of force, and means controlled by one of said elements for moving the chassis and support toward or away from each other according as one or the other of said components is superior, said means being controlled by the other of said elements to resist one of said movements between the chassis and support.

27. A shock absorber having power means, means for controlling the same, the controlling means being movable along a path having fixed end positions, a weight for actuating the controlling means for movement along said path, said weight being movable along a path in response to inertia effects thereon, the different paths having points corresponding to each other, and means for yieldingly interengaging the weight and the controlling means, and said weight and yielding means so coacting with each other than after the controlling means has reached an end position along its path, the weight is movable beyond the corresponding position along its path, and the controlling means being movable from its end position upon movement of the weight from an end of its path.

28. A device including a support, a member mounted thereon for movement toward and away from the support, shock absorber means between said member and support responsive to a turn of the device to control said movements for tilting the member, and a second element responsive to inertia effects for controlling the shock absorber to resist movements between the support and member toward each other, as set forth.

29. A shock absorber including power means, an element for controlling the same, means responsive to inertia effects for actuating the element, and hydraulic means yieldingly interengaging the element and said inertia responsive means, as set forth.

30. A device including a supporting member, a member thereon, said members being movable relatively toward and away from each other, means including an inertia responsive element movable in one direction to cause a relative movement of the members toward each other and in a different direction to cause a relative movement of the members away from each other, and a second inertia responsive element movable in different directions relative to one of said members for controlling said means to prevent one of the relative movements between the members.

31. A device including, in combination with an oscillatory member, of power means, an element movable in different directions for controlling the power means, and inertia responsive means movable in different directions relative to said member and having rotary cam engagement therewith so as to cause movement of said element in only one direction, as set forth.

32. A shock absorber including a plurality of spaced alined pistons, a casing therefor having a liquid reservoir between the pistons and cylinders for the latter, means extending through said reservoir for interconnecting the pistons, and a shaft extending through the reservoir and pivotally engaged with said interconnecting means between the pistons, a hydraulic power means having a piston and communicating in advance of said piston with said cylinders, said reservoir communicating with said hydraulic power means at the rear of said piston, and valve means controlling the different communications mentioned.

33. A device including a plurality of members interconnected for yielding movement relative to each other and having means for controlling said movement, and movably mounted means, said movably mounted means and one of said members being differently responsive to inertia effects, and said movably mounted means resting freely on one of said members and being movable in one direction relatively to the member rested on, solely in response to a rapid acceleration in one direction in the movement of such member, to govern the controlling means, said movably mounted means being non-responsive to accelerations in the opposite direction.

34. In a vehicle having a support and a body substantially resiliently mounted thereon, the combination with said body, of means including a member resiliently mounted thereon for movement to and fro along a path and having a different inertia responsive frequency than the body, said means varying the vertical relation between the body and support so as to tend to cause the body to be maintained at a uniform elevation, and means coacting with the member for movement in one or in an opposite direction upon change in direction of movement of said member at any point in the path thereof, and said member being movable without moving said coacting means.

35. A device including a plurality of traveling members associated for movement relative to each other according to the inertia effects of one of said members, power means for yieldingly controlling movements of the members toward and away from each other so as to resist one of said movements and promote another of said movements, and an independent inertia element for controlling said means, said element being swingably mounted at a relatively fixed point on one of the members and being subject to impact by the other member at a point spaced from the first mentioned point to cause the element to swing as a result of a rapid relative movement between the said members.

36. A device including a member, a support therefor, said member and support being movable relatively to each other, means for controlling the relative motion, and means for operating the controlling means, including an actuator and an inertia element carried by one of said members and movable relative thereto, said actuator having a given path of movement, said inertia element being adapted during its movement to continuously exert a force on said actuator to cause movement of said actuator, and said element having a path of movement such that it can continue to move after the said actuator reaches an end of its path.

37. A device adapted for traveling including a member, a movable support therefor, a movable inertia responsive element movable to and fro along a path, and means for moving the support and member toward each other in one position of said element, and said means moving said support and member away from each other in another position of said element, the motion toward each other of the support and member being rapid or retarded depending on the degree of supporting force between the support and member, said means including a control means therefor movable to and fro and having lost motion engagement with the element, said control means being responsive to said element upon change in direction of movement of the element at any point along said path.

38. A device including a plurality of members mounted for movement relative to each other, and means for controlling said relative movement, said means including a control member, an acceleration responsive element, and actuating means operatively connecting said member and element, said control member and governing element being movable to and fro and the governing element having a substantially greater range of movement than the control member, said actuating means being responsive to the direction of movement of the governing element to actuate said control member irrespective of the position of said element on its path of movement.

39. A device including a chassis, a wheeled means resiliently supporting the chassis, and shock absorbers at the different wheels of said means, acting between the chassis and said means, each of said shock absorbers having a weight and a pivoted resiliently mounted arm carrying said weight so that the weight is subject to inertia for controlling the action of said shock absorber, and the different arms being arranged to extend in the general direction of the chassis, fore and aft, so that the weights at the front of the chassis are forward of the pivots and those at the rear of the chassis are rearward of said pivots.

40. A device including in combination with a support, movable up and down, and a member resiliently mounted thereon for movement up or down according to corresponding impulses on said support and having a substantially greater inertia than the support, of a shock absorber including means acting between the member and support for causing upward movement of the support and for causing downward movement of the support, and said means being adapted to yieldably resist downward movement of the support, and means including an inertia responsive element adapted to vibrate in response to impulses communicated to said member and having a substantially smaller mass than the member, said element being movably interengaged with the first mentioned means for a substantial range of control movement of the element, the first mentioned means being subject to the control of said element, and the first and second mentioned means interacting so that the different up and down movements occur in response to up and down movements of the member and support in the same or in opposite directions.

41. A shock absorber including means having different operative relations for controlling different movements of or between a vehicle chassis and support in response to accelerations acting on said chassis, and a movable element responsive to accelerations acting on said support for always preventing the first mentioned means from assuming a particular one of said relations, as set forth.

42. A device including a plurality of members yieldably relatively movable toward and away from each other in response to acceleration effects on one of the members, and means including a casing, a double acting piston means therein for controlling said relative movement, a source of pressure fluid, a control member connecting said source of pressure fluid with the casing for actuating the piston means for movement in one or an opposite direction, said pressure fluid yieldably actuating the piston means so that the latter is adapted to advance against the force of the fluid if the piston means is subjected to a superior force by one of said members, and an acceleration responsive element connected to govern said control member.

43. A shock absorber for a vehicle including a double acting power transmitting piston means therefor, a casing for said piston means, a liquid cylinder, a resiliently actuated piston therein, means communicating in advance of said piston with said casing at different sides of the piston means, and inertia responsive means to control the communicating means to cause the cylinder to communicate with either one or the opposite side of the piston means, said communicating means being adapted to permit each of the piston and piston means to actuate the other according as the piston means is subjected to a force less or greater than that on the piston.

44. A device including a chassis and a support therefor yieldably movable each relatively to the other, in the same and in opposite directions, a shock absorber acting therebetween and having an inertia means fixed relatively to the chassis so as to be adapted for movement in response to movements of the chassis, said shock absorber having means controlled by the inertia means to cause a movement of the chassis in one direction to be accompanied by a movement of the support in the same direction and to resist movements of the chassis and support in opposite directions.

45. A shock absorber including an inertia responsive element movable to and fro, an actuator controlled thereby for to and fro movement along a path, power transmitting means responsive to the actuator, the latter causing different operations of the power transmitting means according as the actuator reaches different positions along its path, and means interengaging the element and actuator so that the element is adapted to continue its motion along its path after the actuator attains one of said positions, and the actuator being shifted from said position toward another position upon change in direction of the element at any point along its path.

46. A device including a plurality of members adapted for yielding rapid up and down movement toward and away from each other, in response to variable forces exerted on one of the members, means having different positions of operation for differently controlling said movements, the controlling means including an inertia means responsive to upward and downward movements, said controlling means being maintained in one or another of the operative positions subject to the inertia means, and said inertia means being differently responsive to upward and downward accelerated movements to maintain the controlling means in only one of said positions.

47. A device including a chassis and a support therefor yieldably rapidly movable each relatively to the other in the same and in opposite directions, a shock absorber acting therebetween and having an inertia means, said shock absorber having power transmitting means controlled by the inertia means to cause movements of the chassis and support to occur in the same direction and to resist movements of the chassis and support in opposite directions, in response to inertia effects on the inertia means caused by rapid movements, and said inertia means being differently responsive to an accelerated downward movement of the support to cause downward movement of the latter while the chassis is moving upward.

48. A device including a chassis, a support therefor, the chassis and support being adapted for yielding movement relative to each other, means for controlling the relative movement, and inertia means responsive to a rapid upward acceleration of the support to cause said means to exert a downward force thereon relative to the chassis.

49. A shock absorber including a plurality of movable elements differently responsive to acceleration, a control member controlling the movements of the shock absorber, and means operatively connecting said control member and said elements, the connecting means being such that one of the elements can move the control member means in opposition to the other element, and without substantially affecting the latter.

50. A device including a plurality of members yieldably movable toward and away from each other, hydraulic means to control said movements and including a single valve movable into different operative positions according to the different movements to be controlled, elements differently responsive to inertia effects, and means interengaging said elements with said valve, and one of the elements being superior to the other for actuating the valve in opposition to the other element, as set forth.

51. A device including a chassis and a support therefor adapted for yielding movements relative to each other, inertia responsive elements mounted respectively on the chassis and support, and means for controlling said movements, said means being so controlled by said elements that the element on the support is superior to that on the chassis.

52. A device including a chassis and a support therefor yieldably movable up and down relatively to each other, hydraulic power transmitting means for controlling said movements including a double acting piston means, a valve movable between different positions for controlling the flow of liquid to different sides of the piston means, inertia means responsive to an accelerated movement of the support for moving the valve always to one position, and means whereby the valve may be moved to another position.

53. A hydraulic shock absorber including a double acting piston means, a valve movable between different operative positions for controlling the flow of liquid to different sides of the piston means, an inertia responsive means movable to and fro for controlling the valve, and means engaging said inertia responsive means with the valve so that the former can continue its motion without change in direction after the valve has attained one of its operative positions, and the valve being maintained in said operative position during said continued motion.

54. A device including a chassis and a support therefor yieldably movable up and down relatively to each other, a hydraulic shock absorber for controlling the movements, including a double acting piston means, means for supplying liquid under pressure to different sides of the piston means, a valve movable between different positions for controlling the flow of the liquid to different sides of the piston means, an inertia responsive element movable to and fro for moving the valve between said different positions, and said inertia responsive element being mounted on the chassis so as to be affected by movements transmitted to the chassis by the support.

55. A device including a plurality of members adapted for yielding movements relative to each other, and means for controlling said movements including an actuator, an inertia means and a yielding means interengaging the same for operation of the actuator by the inertia means.

56. A shock absorber including means adapted to control the action of a vehicle spring, an actuator for said means movable between different positions, an inertia means having a normally neutral position and being movable in different directions therefrom, a yielding means interengaging the inertia means and the actuator, said yielding means being operative in said different directions for movement of the actuator to one or another of its positions according as the inertia means moves in one or a different direction.

57. A shock absorber having fluid control means having a short path of motion for rapid movement between different fixed points, a weight responsive to inertia, and a yielding means interengaging the weight and said means for actuation of the latter by the weight, said yielding means permitting said weight to continue its motion after said means has been moved to one of said points.

58. A shock absorber having means for affecting movements between a chassis and a support therefor, an actuator for setting said means, an inertia responsive means, and a friction clutch interengaging the latter and the actuator.

59. A device including a chassis and support therefor yieldably movable relatively to each other, means for causing movements therebetween and for yieldably resisting movements between the chassis and support, and control means including means responsive both to accelerations in a vertical and a horizontal direction for controlling the first mentioned means.

60. An hydraulic shock absorber comprising, means adapted to circulate fluid within the shock absorber; fluid flow control means for restricting said fluid circulation; and means responsive to accelerations in the movement of the shock absorber in a vertical direction, and to centrifugal force due to the movement of the shock absorber through a curved path in a horizontal plane, for adjusting the control means to vary its restriction to the circulation of the fluid.

61. An hydraulic shock absorber comprising, means adapted to circulate fluid within the shock absorber; fluid flow control means for restricting said fluid circulation; and an inertia weight pivotally supported by the shock absorber and adapted in response to both, acceleration in the movement of the shock absorber in a vertical direction, and centrifugal force resulting from the movement of the shock absorber through a curved path in a horizontal plane, to adjust the control device to vary its restriction to the circulation of the fluid.

62. An hydraulic shock absorber comprising, in combination, means for circulating fluid; means for controlling said fluid circulation; an inertia mass adapted to be actuated relatively to the shock absorber for adjusting said fluid flow controlling means; and means pivotally supporting said inertia mass on one side of its horizontal center, said inertia mass being movable in response to accelerations in the vertical movements of the shock absorber and also to centrifugal force resulting from the movement of the shock absorber through a curved path in a horizontal plane for adjusting said means.

63. In a shock absorber the combination with a first member; a second member movable relatively thereto and arranged to displace through a passage a body of pressure fluid; and fluid flow control means for restricting the flow of fluid; of means responsive to accelerations in the movement of one of said members in a vertical direction and to centrifugal force due to a movement of said member through a curved path in a substantially horizontal plane, said means being connected to adjust said fluid flow control means.

64. In a shock absorber the combination with a first member; a second member movable relatively thereto and arranged to displace through a passage a body of pressure fluid; and fluid flow control means for restricting the flow of fluid; of a weight supported for movement in a plane inclined with respect to the horizontal, thereby being responsive to accelerations in a vertical direction and to centrifugal accelerations in a substantially horizontal direction, said weight being connected to adjust said fluid flow control means.

65. In a shock absorber the combination with a first member; a second member movable relatively thereto and arranged to displace through a passage a body of pressure fluid; and fluid flow control means for restricting the flow of fluid; of a weighted lever supported by one of said members for movement about a pivotal axis inclined relatively to the horizontal and vertical, thereby being responsive to accelerations in a vertical direction and to centrifugal accelerations in a substantially horizontal direction, said lever being connected to adjust said fluid flow control means.

66. A shock absorber comprising, in combination, a reciprocating pressure fluid motor; a source of fluid under pressure; a valve connecting said motor and said source and controlling the flow of pressure fluid to and from said motor; and means responsive to accelerations in the movement of said motor in a vertical direction and to centrifugal force due to a movement of the motor through a curved path in a substantially horizontal plane, said means being connected to adjust said valve.

67. A shock absorber comprising, in combination, a reciprocating pressure fluid motor; a source of fluid under pressure including a cylinder and a spring-urged piston movable in said cylinder; a valve connecting said motor and said source and controlling the flow of pressure fluid to and from said motor; and means responsive to accelerations in the movement of said motor in a vertical direction and to centrifugal force due to a movement of the motor through a curved path in a substantially horizontal plane, said means being connected to adjust said valve.

68. A shock absorber comprising, in combination, a first member; a second member movable relatively thereto and arranged to displace through a passage a body of pressure fluid; fluid flow control means for restricting the flow of fluid; a mass supported by one of said members for movement relatively to the said member in a substantially vertical direction; means for biasing said mass towards a predetermined position relatively to the member supporting said mass; and a yielding connection between said mass and said control means for adjusting said control means in response to the direction of movement of said mass irrespective of the position of the mass relatively to the member supporting said mass.

69. A shock absorber comprising, in combination, a first member; a second member movable relatively thereto and arranged to displace through a passage a body of pressure fluid; fluid flow control means for restricting the flow of fluid; a mass supported by one of said members for movement relatively to the said member in a substantially vertical direction; means for biasing said mass towards a predetermined position relatively to the member supporting said mass; and means including a friction clutch operatively connecting said mass and said control means for governing said control means in response to the direction of movement of said mass relatively to the member supporting said mass.

70. A shock absorber comprising, in combination, a first member; a second member movable relatively thereto and arranged to displace through a passage a body of pressure fluid; fluid flow control means for restricting the flow of fluid; a first element responsive to accelerations in the movement of said first member in a vertical direction; a second element responsive to accelerations in the movement of said second member in a vertical direction, said first and second element being connected jointly to adjust said fluid flow control means.

71. A shock absorber comprising, in combination, a first member; a second member movable relatively thereto and arranged to displace through a passage a body of pressure fluid; fluid flow control means for restricting the flow of fluid; a first element responsive to accelerations in the movement of said first member in a vertical direction; a second element responsive to accelerations in the movement of said second member in a vertical direction; a yielding connection between said first element and said fluid flow control means for actuation of said control means in response to the direction of a movement of said first element; and means connecting said second element and said fluid flow control means for actuation of said control means in response to a movement in one direction of said second element, but not in response to a movement in the opposite direction.

72. A shock absorber comprising, in combination, a first member; a second member movable relatively thereto and arranged to displace through a passage a body of pressure fluid; fluid flow control means for restricting the flow of fluid; a first mass supported by said first member for movement relatively to said first member in a substantially vertical direction; means for biasing said first mass towards a predetermined position relatively to said first member; a second mass supported by said second member for movement relatively to said second member in a substantially vertical direction; means for biasing said second mass towards a predetermined position relatively to said second member; a yielding connection between said first mass and said control means for an actuation of said control means in response to the direction of a movement of said first mass relatively to said first member; and means connecting said second mass and said control means for actuation of said control means in response to a movement of said second mass in one direction relatively to said second member, but not in response to a movement in the opposite direction.

73. A shock absorber comprising, in combination, a first member; a second member movable relatively thereto and arranged to displace through a passage a body of pressure fluid; fluid flow control means for restricting the flow of fluid; a first element responsive to accelerations in the movement of said first member in a vertical direction and to centrifugal accelerations acting on said first member in a substantially horizontal direction; a second element responsive to accelerations in the movement of said second member in a vertical direction, said first and second element being connected jointly to adjust said fluid flow control means.

74. A shock absorber comprising, in combination, a first member; a second member movable relatively thereto and arranged to displace through a passage a body of pressure fluid; fluid flow control means for restricting the flow of fluid; a first element responsive to accelerations in the movement of said first member in a vertical direction and to centrifugal acceleration acting on said first member in a substantially horizontal direction; a second element responsive to accelerations in the movement of said second member in a vertical direction; a yielding connection between said first element and said fluid flow control means for actuation of said control means in response to the direction of a movement of said first element; and means connecting said second element and said fluid flow control means for actuation of said control means in response to a movement in one direction of said second element, but not in response to a movement in the opposite direction.

75. A shock absorber comprising, in combination, a first member; a second member movable relatively thereto and arranged to displace through a passage a body of pressure fluid; fluid flow control means for restricting the flow of fluid; a first mass supported by said first member for movement relatively to said first member in a direction inclined to both the horizontal and the vertical said first mass thereby becoming responsive to both horizontal and vertical accelerations acting on said first member; means for biasing said first mass towards a predetermined position relatively to said first member; a second mass supported by said second member for movement relatively to said second member in a substantially vertical direction; means for biasing said second mass towards a predetermined position relatively to said second member; a yielding connection between said first mass and said control means for an actuation of said control means in response to the direction of a movement of said first mass relatively to said first member; and means connecting said second mass and said control means for actuation of said control means in response to a movement of said second mass in one direction relatively to said second member, but not in response to a movement in the opposite direction.

76. A shock absorber comprising, in combination, a first member adapted to be connected to the chassis of a vehicle; a second member movable relatively to said first member and adapted to be connected to a support of a vehicle chassis, said second member being arranged to displace through a passage a body of pressure fluid; a fluid valve for controlling the flow of fluid; a first weighted lever supported by said first member for movement about a pivotal axis inclined relatively to the horizontal and the vertical direction thereby being responsive to accelerations in a vertical direction and to centrifugal accelerations in a substantially horizontal direction; a first spring for biasing said first lever towards a predetermined position relatively to said first member; a second weighted lever supported for movement about a substantially horizontal axis, thereby being responsive to accelerations in a vertical direction; a second spring biasing said second lever towards a predetermined position relatively to said second member; means including a friction clutch connecting said valve and said first lever for an actuation of said valve in response to the direction of a movement of said first lever relatively to said first member; and means connecting said second lever and said valve for actuation of said valve in response to a movement of said second lever in one direction relatively to said second member, but not in response to a movement in the opposite direction.

77. In a shock absorber having two members movable relatively to each other and adapted to be connected between two movable bodies, the relative movement of which is to be controlled; an element controlling the resistance of the shock absorber against a movement of the one member relatively to the other; a first mass responsive to accelerations acting on one of said members and connected to control said element; a second mass responsive to accelerations acting on the other of said members and connected to override the control on said element of said first mass when acted upon by an acceleration in one direction, but not to counteract said first mass when acted upon by an acceleration in the opposite direction.

78. In a shock absorber the combination with a first member; a second member movable relatively thereto and arranged to displace through a passage a body of pressure fluid in response to such movement; and fluid flow control means for restricting the flow of fluid; of a movable mass responsive to centrifugal accelerations acting upon said mass in a substantially horizontal direction upon a movement of said mass through a curved path; and a yielding connection between said mass and said control means for adjusting said control means in response to the direction of movement of said mass irrespective of the position of the mass relatively to the member supporting said mass.

79. In a shock absorber the combination with a first member; a second member movable relatively thereto and arranged to displace through a passage a body of pressure fluid in response to such movement; and fluid flow control means for restricting the flow of fluid; of a movable mass responsive to centrifugal accelerations acting upon said mass in a substantially horizontal direction upon a movement of said mass through a curved path; means for biasing said mass toward a predetermined position; and a yielding connection between said mass and said control means for adjusting said control means in response to the direction of movement of said mass irrespective of the position of the mass relatively to the member supporting said mass.

80. A shock absorber comprising, in combination, a first member; a second member movable relatively thereto and arranged to displace through a passage a body of pressure fluid; fluid flow control means for restricting the flow of fluid; a mass supported by one of said members for movement relatively to said member in response to substantially horizontal accelerations acting on said mass; means for biasing said mass towards a predetermined position relatively to the member supporting said mass; and means including a friction clutch operatively connecting said mass and said control means for governing said control means in response to the direction of movement of said mass relatively to the member supporting said mass.

81. A shock absorber comprising, in combination, a first member; a second member movable relatively thereto and arranged to displace through a passage a body of pressure fluid; fluid flow control means for restricting the flow of fluid; a first element responsive to accelerations in the movement of said first member in a vertical direction; a second element responsive to accelerations in the movement of said second member in a substantially horizontal direction, said first and second member being connected jointly to adjust said fluid flow control means.

82. A shock absorber comprising, in combination, a first member; a second member movable relatively thereto and arranged to displace through a passage a body of pressure fluid; fluid flow control means for restricting the flow of fluid; a first element responsive to accelerations in the movement of said first member in a vertical direction; a second element responsive to accelerations in the movement of said second member in a substantially horizontal direction; a yielding connection between said second element and said fluid flow control means for actuation of said control means in response to the direction of a movement of said second element; and means operatively connecting said first element and said fluid flow control means for exerting on said control means a governing action in response to movements of said first element.

83. A shock absorber comprising, in combination, a first member; a second member movable relatively thereto and arranged to displace through a passage a body of pressure fluid; fluid flow control means for restricting the flow of fluid; a first mass supported by said first member for movement relatively to said first member in response to substantially horizontal accelerations acting on said first member; means for biasing said first mass towards a predetermined position relatively to said first member; a second mass supported by said second member for movement relatively to said second member in a substantially vertical direction; means for biasing said second mass towards a predetermined position relatively to said second member; a yielding connection between said first mass and said control means for an actuation of said control means in response to the direction of a movement of said first mass relatively to said first member; and means connecting said second mass and said control means for actuation of said control means in response to a movement of said second mass in one direction relatively to said second member, but not in response to a movement in the opposite direction.

PAUL KOLLSMAN.